US012619178B2

(12) United States Patent
Yoshioka et al.

(10) Patent No.: US 12,619,178 B2
(45) Date of Patent: May 5, 2026

(54) FIXING APPARATUS AND IMAGE FORMING APPARATUS

(71) Applicant: CANON KABUSHIKI KAISHA, Tokyo (JP)

(72) Inventors: Mahito Yoshioka, Shizuoka (JP); Tetsuichiro Fujimoto, Shizuoka (JP); Keisuke Mochizuki, Shizuoka (JP); Kohei Haematsu, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/951,795

(22) Filed: Nov. 19, 2024

(65) Prior Publication Data

US 2025/0076792 A1 Mar. 6, 2025

Related U.S. Application Data

(63) Continuation of application No. 18/360,925, filed on Jul. 28, 2023, now Pat. No. 12,181,814.

(30) Foreign Application Priority Data

Aug. 4, 2022 (JP) ................................ 2022-124522

(51) Int. Cl.
*G03G 15/20* (2006.01)

(52) U.S. Cl.
CPC ..... *G03G 15/2017* (2013.01); *G03G 15/2053* (2013.01); *G03G 15/2057* (2013.01); *G03G 15/206* (2013.01); *G03G 15/2064* (2013.01)

(58) Field of Classification Search
CPC .......... G03G 15/2017; G03G 15/2053; G03G 15/2057; G03G 15/206; G03G 15/2064
See application file for complete search history.

(56) References Cited

U.S. PATENT DOCUMENTS

| | | | | |
|---|---|---|---|---|
| 12,181,814 | B2 * | 12/2024 | Yoshioka .......... | G03G 15/2057 |
| 2002/0159784 | A1 | 10/2002 | Yoshioka | |
| 2004/0091279 | A1 | 5/2004 | Izawa | |
| 2007/0036594 | A1 | 2/2007 | Mitsuoka | |
| 2015/0212462 | A1 | 7/2015 | Ishikuro | |

FOREIGN PATENT DOCUMENTS

| | | | |
|---|---|---|---|
| JP | H05273879 | A | 10/1993 |
| JP | 2002132072 | A | 5/2002 |
| JP | 2003043837 | A | 2/2003 |
| JP | 2009042303 | A | 2/2009 |
| JP | 2013231808 | A | 11/2013 |
| JP | 2015138264 | A | 7/2015 |

* cited by examiner

*Primary Examiner* — Sophia S Chen
(74) *Attorney, Agent, or Firm* — Venable LLP

(57) ABSTRACT

A fixing apparatus includes a rotatable fixing member, a rotatable pressurizing member, a heating portion, and a circuit portion including a contact member and configured to remove electric charge from the fixing member, the contact member being in contact with the fixing member. A surface layer of the pressurizing member is electrically connected to the circuit portion via a surface layer of the fixing member. In a case where a surface resistivity of the surface layer of the pressurizing member is represented by X (Ω/□) and a surface resistivity of the surface layer of the fixing member is represented by Y (Ω/□), $4.0 \le \log X \le 13.0$, $5.0 \le \log Y \le 14.0$, $\log Y \ge 13.0 - \log X$, and $\log Y \le 23.0 - \log X$ are satisfied.

2 Claims, 9 Drawing Sheets

FIXING APPARATUS AND IMAGE FORMING APPARATUS

CROSS-REFERENCE TO RELATED APPLICATION

This application is a Continuation of U.S. patent application Ser. No. 18/360,925, filed Jul. 28, 2023, the entirety of which is hereby incorporated herein by reference.

BACKGROUND OF THE INVENTION

Field of the Invention

The present invention relates to a fixing apparatus that fixes an image to a recording material, and an image forming apparatus that forms an image on a recording material.

Description of the Related Art

An image forming apparatus of an electrophotographic system forms an image on a recording material by using toner as developer, and then fixes the image to the recording material by a fixing apparatus. A fixing apparatus of a thermal fixation system fixes an image by heating the image on a recording material while nipping and conveying the recording material between a fixing member and a pressurizing member. In a fixing apparatus of this kind, when the pressurizing member is charged by frictional charging or the like, a situation in which toner on the recording medium receives repulsive force and attaches to the fixing member, and then toner attaches to the recording material after the fixing member rotates once can occur. The image defect caused by deviation of an electrostatic force acting on the toner in the nip portion of the fixing apparatus from an appropriate range is known as electrostatic offset.

Japanese Patent Application Laid-Open No. 2002-132072 discloses a technique in which the electrostatic offset is suppressed by providing a fixing film with a conductive layer having electrical conductivity, applying a voltage to the conductive layer exposed at a film end portion in the longitudinal direction by bringing a power supply brush into contact therewith, and grounding a pressurizing roller opposing the fixing film. Japanese Patent Application Laid-Open No. 2009-042303 discloses a technique in which the electrostatic offset is suppressed by bringing a conductive layer of a fixing film into contact with a conductive rubber ring provided at an end portion of a pressurizing roller and grounding a core metal of the pressurizing roller.

Due to the demand for reduction of the size and cost of the image forming apparatus, there has been a demand for reducing occurrence of the electrostatic offset with a simpler configuration.

SUMMARY OF THE INVENTION

The present invention provides a fixing apparatus and an image forming apparatus that can reduce occurrence of the electrostatic offset with a simple configuration.

According to one aspect of the invention, a fixing apparatus includes a rotatable fixing member, a rotatable pressurizing member configured to abut the fixing member at a nip portion, a heating portion configured to heat the fixing member, and a circuit portion including a contact member and configured to remove electric charge from the fixing member, the contact member being in contact with the fixing member, wherein the fixing apparatus is configured to heat an image on a recording material by the fixing member to fix the image to the recording material while nipping and conveying the recording material between the fixing member and the pressurizing member in the nip portion, wherein a surface layer of the pressurizing member is electrically connected to the circuit portion via a surface layer of the fixing member, and wherein in a case where a surface resistivity of the surface layer of the pressurizing member is represented by X (Ω/□) and a surface resistivity of the surface layer of the fixing member is represented by Y (Ω/□), $4.0 \leq \log X \leq 13.0$, $5.0 \leq \log Y \leq 14.0$, $\log Y \geq 13.0 - \log X$, and $\log Y \leq 23.0 - \log X$ are satisfied.

Further features of the present invention will become apparent from the following description of exemplary embodiments with reference to the attached drawings.

DESCRIPTION OF THE EMBODIMENTS

Embodiments of the present disclosure will be described below with reference to drawings.

First Embodiment

Configurations of an image forming apparatus and a fixing apparatus according to a first embodiment will be described below. To be noted, "image forming apparatus" may be an apparatus that forms an image on a sheet material serving as a recording material such as a monofunctional printer, a copier, or a multifunctional apparatus.

Figure 1:
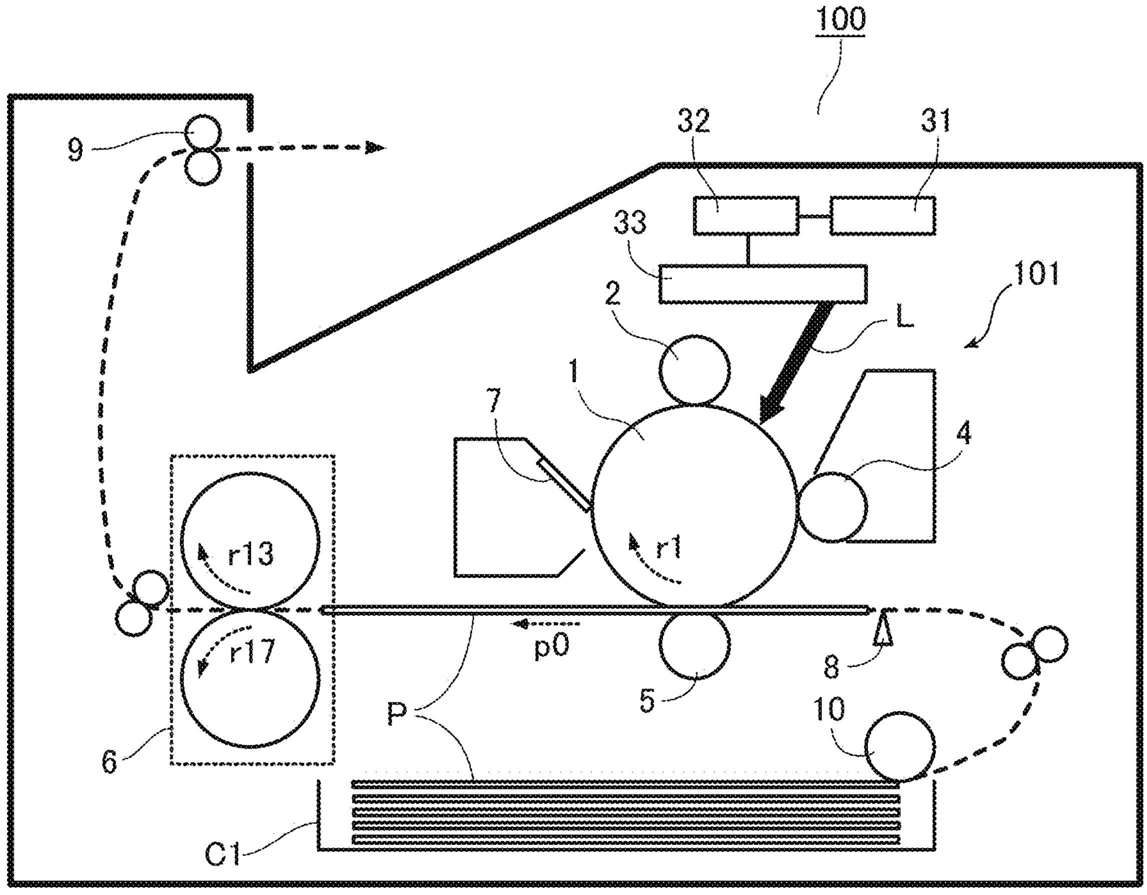
FIG. 1 is a schematic view of an image forming apparatus according to a first embodiment.

FIG. 1 is a schematic view of a printer 100 serving as an image forming apparatus according to the present embodiment. The printer 100 is a monochromatic laser beam printer that forms an image on a recording material P by an electrophotographic process on the basis of image information received from the outside. To be noted, as the recording material P serving as a recording medium, a wide variety of sheet materials of different sizes and materials can be used. Examples of the sheet materials include paper sheets such as plain paper sheets and cardboards, plastic films, cloths, surface-treated sheet materials such as coated paper sheets, and sheet materials of irregular shapes such as envelopes and index paper sheets.

The printer 100 includes an image forming portion 101 that forms an image (toner image) on the recording material P by using toner serving as developer, a fixing apparatus 6 that fixes the image to the recording material P, and a conveyance mechanism for the recording material P. The image forming portion 101 includes a photosensitive drum 1 serving as an image bearing member, a charging unit 2, an exposing unit 33, a developing unit 4, a transfer roller 5, and a cleaning unit 7.

The photosensitive drum 1 is an electrophotographic photosensitive member including a cylindrical base body and a photosensitive layer of an organic photoconductor or the like formed on the outer circumferential portion of the base body. In image formation, the photosensitive drum 1 is rotationally driven in an arrow r1 direction in the drawings at a predetermined peripheral speed. The charging unit 2 is, for example, a charging roller of a contact charging system. The charging unit 2 is subjected to a voltage applied from an unillustrated electric circuit, and thus uniformly charges the surface of the photosensitive drum 1 to a predetermined polarity and predetermined potential. The charging unit 2 of the present embodiment charges the surface of the photosensitive drum 1 to a surface potential of −700 V with respect to 0 V serving as a standard potential (frame ground) of the printer 100. Although the details of the standard potential will be described later, potential values and voltage values described below are expressed with the standard potential of 0 V as the standard.

The exposing unit 33 is a laser beam scanner. A video controller 31 of the printer 100 converts image information received together with an execution instruction for image formation from the outside into image formation information, and transmits the image formation information to a controller 32 of the exposing unit 33. The controller 32 drives the exposing unit 33 on the basis of the image formation information, and causes the exposing unit 33 to output a laser beam L. The surface of the photosensitive drum 1 is irradiated with the laser beam L to remove charges in the exposed portion, and thus an electrostatic latent image corresponding to the image information is formed on the surface of the photosensitive drum 1. In the present embodiment, the output of the laser beam L is adjusted such that the surface potential (light potential) of the exposed portion of the photosensitive drum 1 is −200 V.

The developing unit 4 bears toner serving as developer on a developer bearing member such as a developing roller to supply the toner to the photosensitive drum 1, and thus develops the electrostatic latent image on the photosensitive drum 1 into a toner image. In the present embodiment, toner having a negative charging polarity is used as the developer. In addition, the developing roller is subjected to a voltage of −400 V applied from an unillustrated electric circuit. As a result of this, the toner does not attach to a non-exposed portion of the surface of the photosensitive drum 1 where the surface potential is −700 V, and the toner attaches to the exposed portion where the surface potential is −200 V. The toner image developed by the developing unit 4 is borne on the photosensitive drum 1, and is delivered toward a transfer portion formed between the photosensitive drum 1 and the transfer roller 5.

In parallel with the formation of the toner image by the image forming portion 101, recording materials P accommodated in a cassette C provided in a lower portion of the printer 100 are fed one by one by a feeding roller 10. The conveyance timing of the recording material P to the transfer portion is adjusted on the basis of a timing in which the leading end of the recording material P is detected by a sensor 8. As a result of this, positioning of the image on the recording material P in the sheet conveyance direction serving as a sub-scanning direction for image formation is performed.

The transfer roller 5 serving as a transfer unit is subjected to a voltage of a positive polarity applied from an unillustrated electric circuit. As a result of this, the toner image is transferred from the photosensitive drum 1 onto the recording material P, and thus an unfixed image is formed on the recording material P. The value of the voltage applied to the transfer roller 5 changes in accordance with the use environment of the printer 100, the electric resistance of the recording material P, and/or the like, but is within a range of about +0.5 kV to +3.0 kV. Transfer residual toner remaining on the surface of the photosensitive drum 1 is removed by the cleaning unit 7, and thus the surface of the photosensitive drum 1 returns to a state appropriate for the process of charging and later processes.

The recording material P having passed through the transfer portion is conveyed to the fixing apparatus 6. The fixing apparatus 6 heats the image on the recording material P while nipping and conveying the recording material P between a rotary member pair, and thus fixes the image to the recording material P. The details of the fixing apparatus 6 will be described later. The recording material P having passed through the fixing apparatus 6 is discharged to the outside of the apparatus by a discharge roller pair 9, and is supported as a product on a discharge tray provided at an upper surface portion of the printer 100.

Fixing Apparatus

Figure 2:
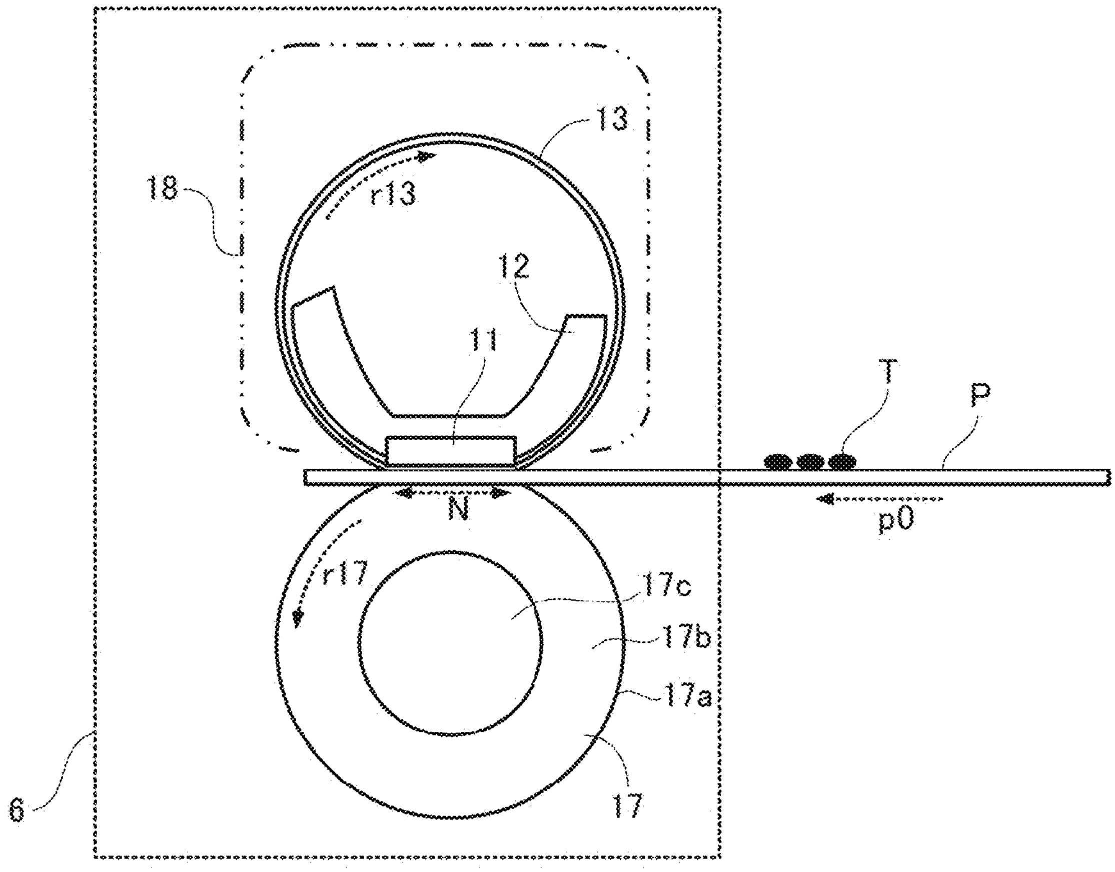
FIG. 2 is a schematic diagram illustrating a cross-section of a fixing apparatus according to the first embodiment.
Figure 3:
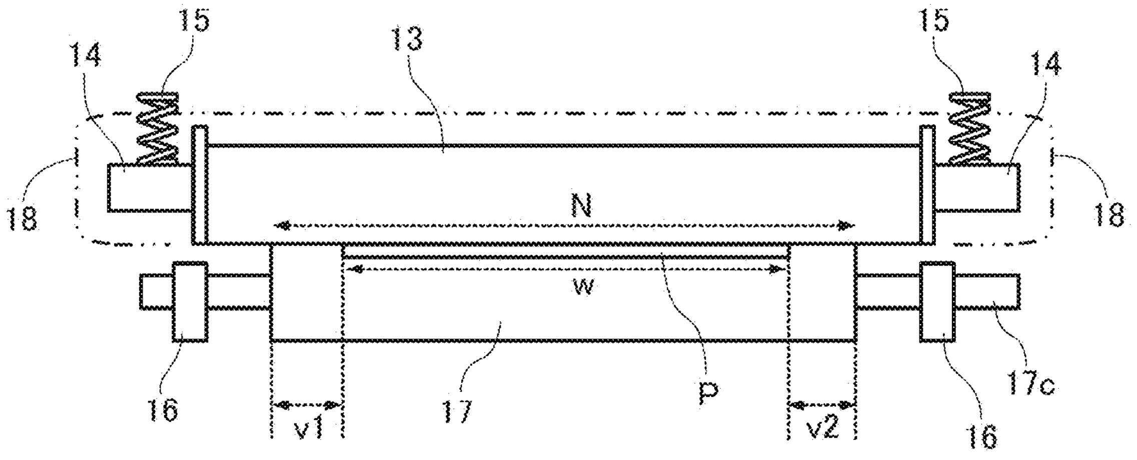
FIG. 3 is a schematic view of the fixing apparatus according to the first embodiment.

The configuration of the fixing apparatus 6 in the present embodiment will be described. FIG. 2 is a schematic diagram illustrating a sectional configuration of the fixing apparatus 6. FIG. 3 is a schematic diagram illustrating a layout of main members of the fixing apparatus 6 in a longitudinal direction described below.

As illustrated in FIGS. 2 and 3, the fixing apparatus 6 includes a film unit 18 that is a film assembly, and a pressurizing roller 17. The film unit 18 is constituted by a fixing film 13, a heater 11, a heater holder 12, and end flanges 14.

The fixing film 13 is an example of a rotatable fixing member (first rotary member) that comes into contact with an image surface (surface that bears unfixed toner T) of the recording material P. The pressurizing roller 17 is an example of a rotatable pressurizing member (second rotary member or opposing member) that comes into contact with a surface of the recording material P opposite to the image surface. The heater 11 is an example of a heating portion that heats the fixing member to fix the image to the recording material P.

The heater 11 is supported on a lower surface (surface on the fixing nip side) of the heater holder 12 serving as a holding member. The heater 11 and the heater holder 12 are disposed in an inner space of the fixing film 13 having a tubular shape. The end flanges 14 are attached to respective end portions of the heater holder 12 in the longitudinal direction. The end flanges 14 each include a support portion that supports the heater holder 12 on the inside of the fixing film 13, and a flange portion that extends in a flange shape from the support portion and regulates the corresponding one of the end portions of the fixing film 13.

The pressurizing roller 17 abuts a nip forming unit with the fixing film 13 therebetween. The nip forming unit is constituted by the heater 11 and the heater holder 12. The end flanges 14 are urged toward the pressurizing roller 17 by pressurizing springs 15. As a result of this, a fixing nip N of a predetermined width is formed between the film unit 18 and the pressurizing roller 17. In the fixing nip N, the fixing film 13 is in firm contact with the heater 11 and the pressurizing roller 17 by a pressurizing force of the pressurizing springs 15.

To be noted, the nip forming unit is not limited to a unit in which the heater 11 comes into contact with the inner surface of the fixing film 13. For example, a configuration in which a thin plate or a sheet material having a high thermal conductivity is provided between the heater 11 and the fixing film 13 such that the heat of the heater 11 is transmitted to the fixing film 13 via the thin plate or the sheet material.

In the description below, "longitudinal direction of the fixing apparatus 6" or simply "longitudinal direction" refers to a rotation axis direction of the pressurizing roller 17. The longitudinal direction of the fixing apparatus 6 can be also referred to as a generatrix direction of the fixing film 13 and a sheet width direction orthogonal to the sheet conveyance direction in the fixing nip N.

In the present embodiment, a lubricant such as heat-resistant grease is applied between the heater 11 and the inner surface of the fixing film 13, and thus the heater 11 and the fixing film 13 are in a low-friction state with each other. Therefore, the frictional force between the fixing film 13 and the surface of the pressurizing roller 17 is larger. Therefore, when the pressurizing roller 17 is rotationally driven in an arrow r17 direction, the fixing film 13 rotates in an arrow r13 direction with respect to the heater holder 12 while being in firm contact with the heater 11.

A core metal 17*c* of the pressurizing roller 17 that will be described later is held by bearings 16, and movement thereof other than rotation is restricted. A lubricant for reducing the frictional resistance to the rotation of the pressurizing roller 17 is applied on the bearings 16.

The heater 11 includes, for example, an elongated ceramic substrate having a high insulating property or an elongated heat-resistant resin substrate. Examples of the material of the ceramic substrate include alumina (aluminum oxide) and AlN (aluminum nitride), and examples of the material of the heat-resistant resin substrate include polyimide, polyphenylene sulfide: PPS, and liquid crystal polymer. For example, the heater 11 is formed by sequentially forming a heat-generating member on which a heat-generating paste layer is printed, a glass coating layer for protecting the heat-generating member and securing insulation, and the like on the surface of this substrate. Examples of the material of the heat-generating paste layer include Ag/Pd (silver/palladium), $RuO_2$, and $Ta_2N$. In the present embodiment, the heater 11 is formed by forming a heat-generating paste layer of Ag/Pd and a glass coating layer on an alumina substrate.

A power supply terminal electrically connected to the heat-generating member is provided at an end portion of the heater 11 in the longitudinal direction. A connector of a power supply circuit provided in the printer 100 is connected to the power supply terminal, thus power is supplied to the heat-generating member from the power supply circuit, and the heat-generating member generates Joule's heat. On the back side of the heater 11 (side opposite to the fixing nip N), a temperature detection element such a thermistor for detecting the temperature of the heater 11 is disposed. The controller of the printer 100 appropriately controls the duty ratio, wavenumber, and the like of the voltage applied to the heat generating member in accordance with the signal of the temperature detection element, and thus the temperature of the heater 11 and the fixing nip N can be maintained at a target temperature.

The heater holder 12 has a function of supporting the heater 11, generating the pressurizing force at the fixing nip N, and reducing dissipation of heat of the heater 11 to the opposite side to the fixing nip N (heat insulating effect). The heater holder 12 is formed from a rigid, heat-resistant, and thermally-insulating material. To achieve these properties, for example, liquid crystal polymer, phenol resin, PPS, and polyether ether ketone: PEEK are suitable. In the present embodiment, liquid crystal polymer is used as the material of the heater holder 12.

The pressurizing roller 17 includes the core metal 17*c* formed from metal such as stainless steel, free-cutting steel (JIS SUM material), or Al, and an elastic layer 17*b* formed on the outer circumferential surface of the core metal 17*c*. The elastic layer 17*b* can be heat-resistant rubber such as silicone rubber or fluorine rubber, or foam rubber created by foaming silicone rubber or the like. Further, the pressurizing roller 17 includes a surface layer 17*a* that is formed from fluorine resin such as perfluoroalkoxy alkane: PFA, polytetrafluoroethylene: PTFE, or fluorinated ethylene propylene: FEP, or a mixture of these fluorine resins and that covers the elastic layer 17*b* to improve the releasability and wear resistance of the surface of the pressurizing roller 17. The core metal 17*c* of the pressurizing roller 17 is held by the bearings 16 as described above. In the present embodiment, a pressurizing roller 17 having an outer diameter of 25 mm and including the core metal 17*c* formed from Al, the elastic layer 17*b* formed from silicone rubber, and the surface layer 17*a* formed from PFA is used.

Figure 4:
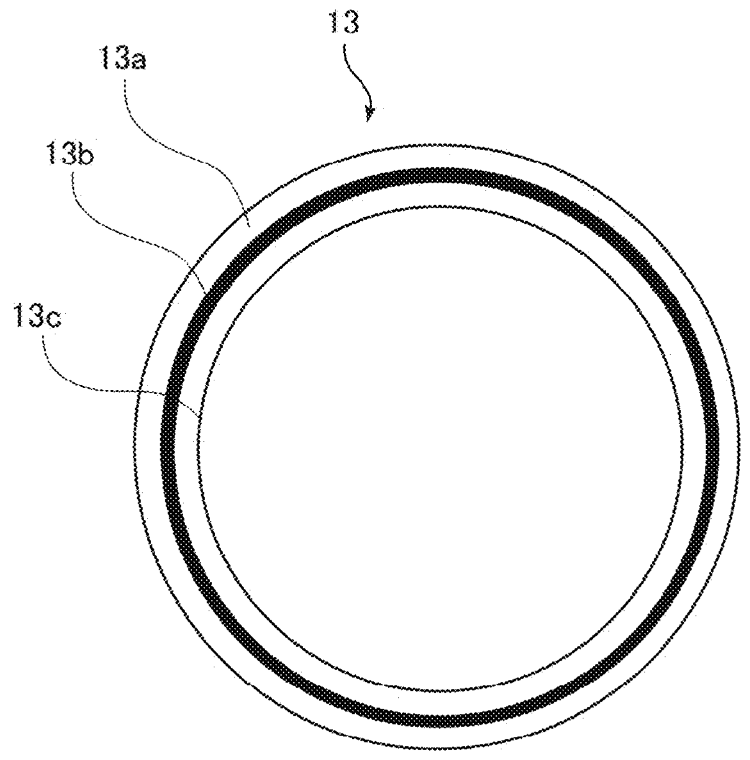
FIG. 4 is a diagram illustrating a layer structure of a fixing film according to the first embodiment.

FIG. 4 illustrates the layer structure of the fixing film 13. For the fixing film 13, heat resistance for resisting the heat from the heater 11, releasability for reducing adhesion of melted unfixed toner image to the surface thereof, and durability and surface strength for reducing breakage thereof caused by passage of the recording material through the fixing nip N or pressure contact with the pressurizing roller 17 are desired. These properties may be achieved by just one material, but this function may be achieved by a combination of a plurality of materials.

For example, as illustrated in FIG. 4, to achieve the heat resistance and durability, a base layer 13*c* of the fixing film 13 is formed as a thin film tube formed from metal such as stainless steel, Al, Ni, Cu, or Zn, or heat-resistant resin such as polyimide or polyamide. A surface layer 13*a* formed on the outer circumferential surface of the base layer 13*c* is formed from fluorine resin having releasability and surface strength.

The base layer 13*c* is a thin film having a thickness of about 200 μm or less and formed in a tubular shape. In the present embodiment, a polyimide tube having a thickness of 75 μm is used as the base layer 13*c*. The fluorine resin used for the surface layer 13*a* is selected from fluorine resin such as PFA, PTFE, FEP, ethylene tetrafluoroethylene: ETFE, chlorotrifluoroethylene: CTFE, or polyvinylidene fluoride: PVDF, or a combination of these fluorine resins. In the present embodiment, the surface layer 13*a* having a thickness of 10 μm and formed from PFA is formed on the outer circumferential side of the base layer 13*c* by coating.

In addition, the fixing film 13 of the present embodiment includes, to make the structure of the base layer 13*c* and the surface layer 13*a* adhered and stably integrated, an adhesive layer 13*b* having a thickness of 5 μm and formed from a mixture of polyimide resin and fluorine resin is provided between the layers described above.

The operation of the fixing apparatus 6 will be described. At the time of image formation, the pressurizing roller 17 is rotationally driven in the arrow r17 direction in FIG. 2, and the fixing film 13 rotates in the arrow r13 direction in accordance with the pressurizing roller 17. In addition, as a result of power supply to the heater 11, the heater 11 is heated to a predetermined target temperature. In this state, the recording material P bearing the unfixed toner T is conveyed in a conveyance direction p0 in FIG. 2. Then, the fixing apparatus 6 heats the unfixed toner T on the recording material P by the fixing film 13 heated by non-radiant heat from the heater 11 while nipping and conveying the recording material P between the fixing film 13 and the pressurizing roller 17 in the fixing nip N. As a result of this, the unfixed toner T is melted, and the image is fixed to the recording material P.

This film heating system heats the image by using the fixing film 13 having a very low heat capacity, and is thus excellent in the quick start property and power saving property.

To be noted, as illustrated in FIG. 3, the length of the fixing nip N in the longitudinal direction is set to a value larger than a maximum width w of the recording material P on which the printer 100 can form an image. Therefore, a state in which the surface of the fixing film 13 and the surface of the pressurizing roller 17 is in contact with each other in a first end region v1 and a second end region v2 outside the passage region of the recording material P is maintained regardless of the size of the recording material P even while the recording material P is passing through the fixing nip N. In the description below, a region in the longitudinal direction that the recording material P of the maximum width w passes through will be referred to as a "sheet passing region".

Control Configuration for Charging Potential of Pressurizing Roller

Figure 5:
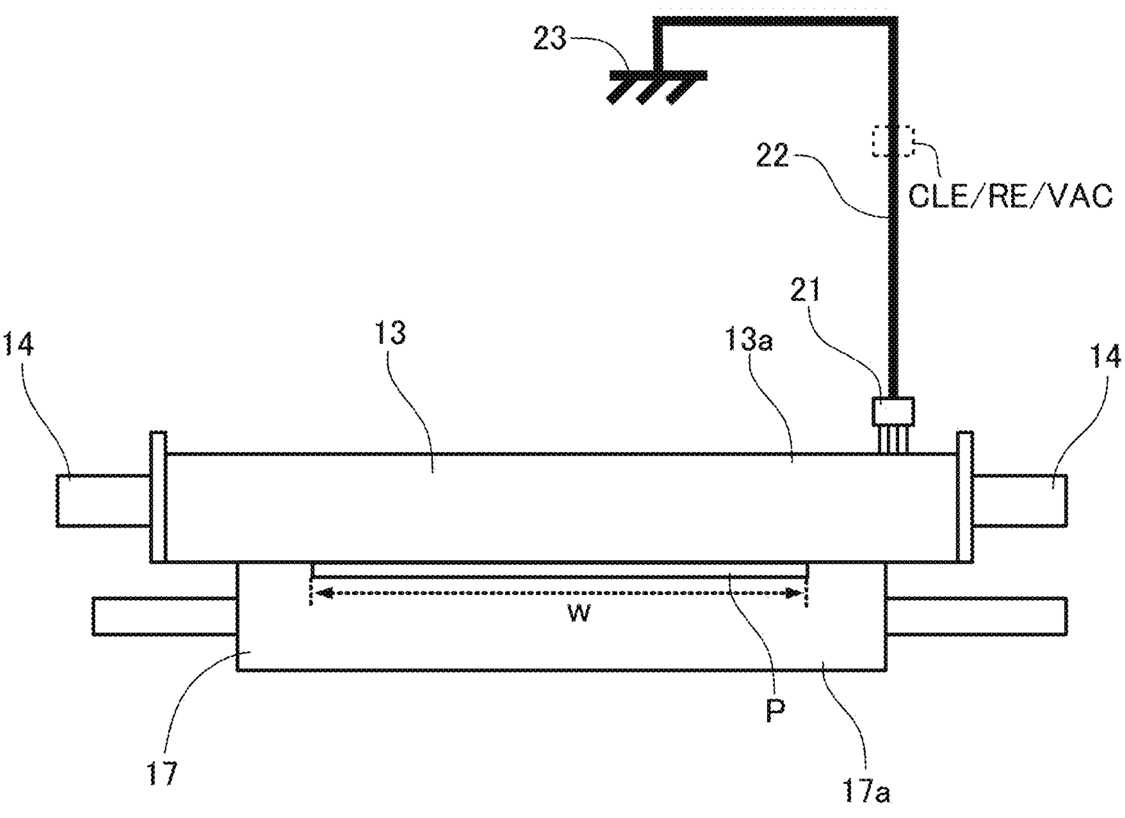
FIG. 5 is a diagram illustrating a charge removing mechanism of a pressurizing roller and the fixing film according to the first embodiment.

Next, a control configuration for the charging potential of the fixing apparatus 6 of the present embodiment will be described. FIG. 5 is a schematic diagram schematically illustrating a configuration related to control of the charging potential of the fixing film 13 and the pressurizing roller 17 according to the present embodiment.

As illustrated in FIG. 5, the fixing apparatus 6 includes a contact member 21 that comes into contact with the surface of the fixing film 13. As the contact member 21, for example, a highly-flexible conductive sheet or conductive brush is preferably used such that the contact member 21 can deform in accordance with the fixing film 13 without damaging the surface of the fixing film 13. In the present embodiment, a conductive brush is used as the contact member 21.

The contact position of the contact member 21 in the longitudinal direction of the fixing apparatus 6 is preferably set to the outside of the sheet passing region so as to reduce soiling of the contact member 21 with paper dust, toner, and the like.

The contact member 21 is connected to an electric ground 23 of the printer 100 via an electric passage circuit 22. The contact member 21 and the electric passage circuit 22 constitute a circuit portion configured to remove charges from the fixing film 13. The electric ground 23 of the printer 100 is a portion that is at the standard potential 0 V of the printer 100. The electric ground 23 serves as the ground for various electric circuits such as an electric circuit for executing a process of the image forming portion 101, an electric circuit for supplying power to a motor that drives rotary members such as the photosensitive drum 1 and the conveyance rollers, and an electric circuit for supplying power to the heater 11. In the case of forming the frame making up the casing of the printer 100 as a metal frame, the frame can serve as the electric ground 23 of the printer 100.

The contact member 21 brought into contact with the surface of the fixing film 13 is connected to the electric ground 23 of the printer 100 via the electric passage circuit 22, and thus the surface charges of the fixing film 13 can be caused to flow to the electric ground 23. As a result of this, the charging potential of the fixing film 13 during use of the fixing apparatus 6 (during image formation) is controlled.

In contrast, in the present embodiment, elements corresponding to the contact member 21 and the electric passage circuit 22 are not provided on the pressurizing roller 17 side. In the present embodiment, the charging potential of the pressurizing roller 17 during use of the fixing apparatus 6 is controlled by using contact between the surface of the pressurizing roller 17 and the surface of the fixing film 13.

The surface of the pressurizing roller 17 is electrically connected to the surface of the fixing film 13 in the fixing nip N, and is configured such that the surface charges of the pressurizing roller 17 flow to the electric ground 23 via the fixing film 13, the contact member 21, and the electric passage circuit 22. The pressurizing roller 17 is configured such that the surface charges thereof substantially do not flow through a path other than the path described above, for example, a path to flow to the bearings 16 via the elastic layer 17*b* and the core metal 17*c*.

Specifically, in the present embodiment, the resistance of a path 1 from the surface of the pressurizing roller 17 to the electric ground 23 via the bearings of the pressurizing roller 17 is much higher than the resistance of a path 2 from the surface of the pressurizing roller 17 to the electric ground 23 via the fixing film 13. The path 1 described above is a path from the surface of the pressurizing roller 17 to the frame of the fixing apparatus 6 serving as the electric ground via the elastic layer 17*b*, the core metal 17*c*, and the bearings of the pressurizing roller 17. The combined resistance of the path 1 is, for example, 10 times or more of the combined resistance of the path 2.

As a method for increasing the resistance of the path 1, for example, bearings having high resistance can be used as the bearings of the pressurizing roller 17. For example, bearings whose resistance from the inner surface thereof (portion fitted with the core metal 17*c*) to the outer surface thereof (portion fitted with the fixing apparatus frame) is higher than the resistance of the surface layer 13*a* of the fixing film 13 from the fixing nip N to the contact member 21 are used. The resistance of the bearings described above can be measured by, for example, a digital ohmmeter MY600 manufactured by Yokogawa Test & Measurement Corporation.

To be noted, as a method for increasing the resistance of the path 1, increasing the resistance of the elastic layer 17*b* of the pressurizing roller 17 can be considered. However, in this case, it should be noted that the elastic layer 17*b* can act as a capacitor and affect the potential in the fixing nip N. If the resistance of the bearings of the pressurizing roller 17 to be high as described above, for example, the capacitor-like behavior of the elastic layer 17*b* can be suppressed by reducing the resistance of the elastic layer 17*b* by dispersing a conductive material such as carbon black therein.

According to the configuration described above, in the present embodiment, the surface charges of the pressurizing roller 17 are removed via the surface of the fixing film 13 connected to the electric ground 23 via the contact member 21. In other words, in this configuration, the charges generated on the surface of the pressurizing roller 17 by frictional charging are caused to flow to the electric ground 23 via the surface of the fixing film 13, the contact member 21, and the electric passage circuit 22, and thus the surface charges of the pressurizing roller 17 are removed. That is, in the present embodiment, the surface of the pressurizing roller 17, the surface of the fixing film 13, the contact member 21, the electric passage circuit 22, and the electric ground 23 substantially constitute a series circuit.

To be noted, the electrical connection between the surface of the pressurizing roller 17 and the surface of the fixing film 13 in the fixing nip N refers to a state in which these surfaces are physically in contact with each other. Specifically, while the recording material P is not passing through the fixing nip N, the surface of the pressurizing roller 17 and the surface of the fixing film 13 are in contact with each other in the entire region of the fixing nip N, and thus these surfaces are electrically connected to each other. While the recording material P is passing through the fixing nip N, the surface of the pressurizing roller 17 and the surface of the fixing film 13 are in contact with each other in the first end region v1 and the second end region v2 (FIG. 3) outside the sheet passing region in the fixing nip N, and thus these surfaces are electrically connected to each other.

According to the configuration described above, a rubber ring does not have to be provided on the core metal 17*c* of the pressurizing roller 17 as a configuration for removing the surface charges of the pressurizing roller 17 as in Japanese Patent Application Laid-Open No. 2009-042303. Therefore, contact failure caused by elastic deformation of the rubber ring and contact failure caused by plastic deformation of the rubber ring derived from long-term use, which are expected in the case of attaching the rubber ring to the core metal 17*c*, can be avoided. That is, in the present embodiment, since the surface of the pressurizing roller 17 and the surface of the fixing film 13 are always in contact with each other, the electrical connection between the pressurizing roller 17 and the electric ground 23 serving as a path for removing the surface charges of the pressurizing roller 17 can be more stably secured.

Surface Resistivity of Pressurizing Roller Surface and Fixing Film Surface

Here, the conditional settings of the surface layers 17*a* and 13*a* of the pressurizing roller 17 and the fixing film 13 for controlling the charging potential of the surface of the pressurizing roller 17 within an appropriate range will be described.

The surface layer 17*a* making up the surface of the pressurizing roller 17 and the surface layer 13*a* making up the surface of the fixing film 13 in the present embodiment are each formed from fluorine resin (specifically, PFA). The surface resistivities of the surface layers 17*a* and 13*b* also referred to as sheet resistance can be adjusted by adding conductive filler to the resin serving as the base material. Examples of the conductive filler include carbon black, carbon nanotube, and particles of metal or metal oxide.

Figure 6:
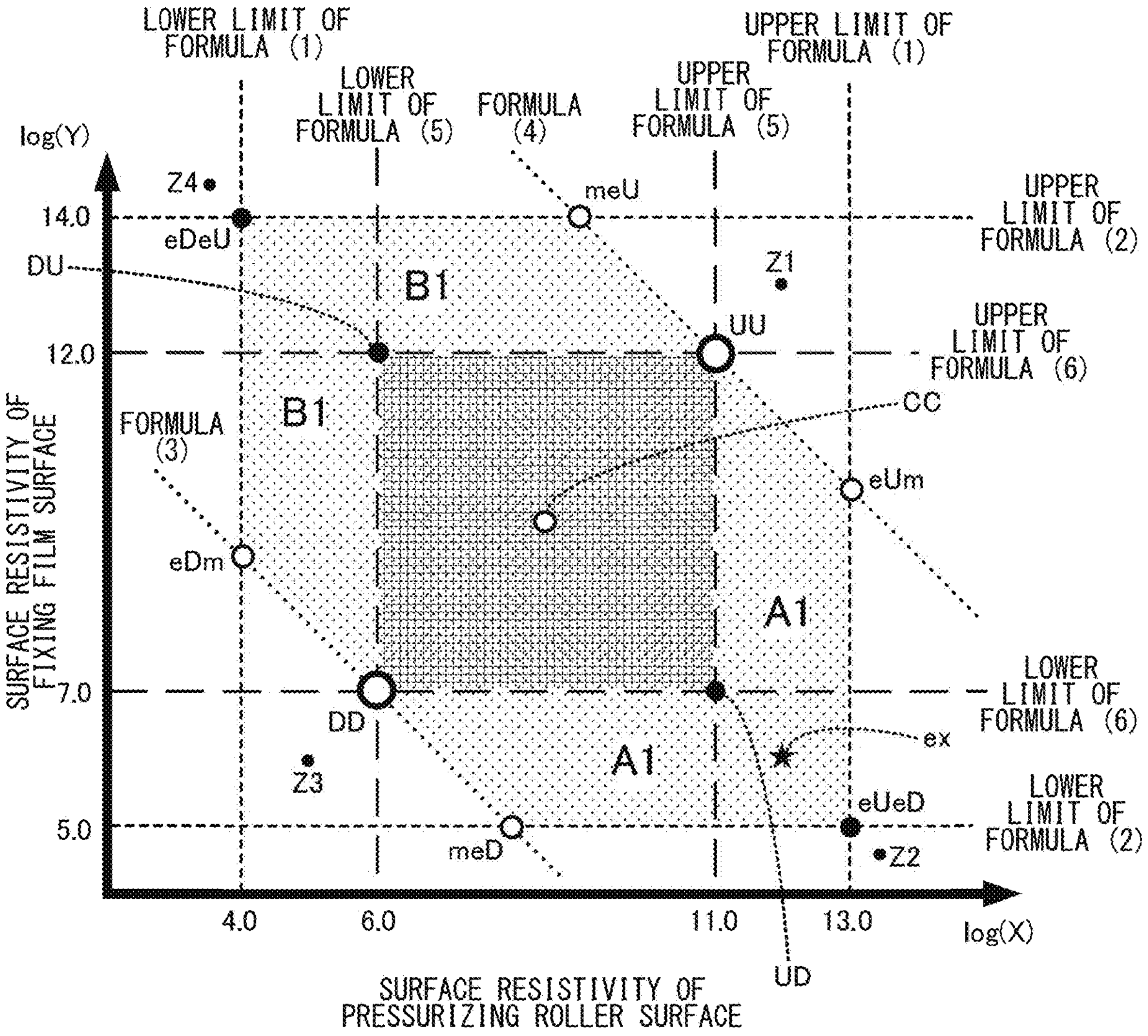
FIG. 6 is a diagram illustrating a relationship between the surface resistivity of the pressurizing roller and the surface resistivity of the fixing film according to the first embodiment.

In the description below, the surface resistivity of the surface of the pressurizing roller 17, that is, the surface resistivity of the surface layer 17*a* is represented by X (Ω/□), and the surface resistivity of the surface of the fixing film 13, that is, the surface resistivity of the surface layer 13*a* is represented by Y (Ω/□). The present embodiment is configured such that the surface resistivities X and Y satisfy all the following formulae (1) to (4). FIG. 6 illustrates regions defined by the formulae (1) to (4) (hatched region and dot pattern region).

$$4.0 \le \log X \le 13.0 \quad (1)$$

$$5.0 \le \log Y \le 14.0 \quad (2)$$

-continued $$\log Y \ge 13.0 - \log X \quad (3)$$

$$\log Y \le 23.0 - \log X \quad (4)$$

To be noted, the measurement of the surface resistivity is performed by using Hiresta-UX MCP-HT800 manufactured by Nittoseiko Analytech Co., Ltd. and a ring probe UR-SS MCP-HTP15 and in a setting in which the voltage is selected from 1 V to 1000 V and the measurement time is 30 seconds.

The reason for setting the surface resistivities X and Y of the surface of the pressurizing roller 17 and the surface of the fixing film 13 in the ranges described above will be described with reference to FIG. 6. In FIG. 6, the horizontal axis indicates the surface resistivity X of the surface of the pressurizing roller 17 in common logarithm, and the vertical axis indicates the surface resistivity Y of the surface of the fixing film 13 in common logarithm. For example, in the case of Y=1.0E+4(Ω/□), the value in the horizontal axis is 4.0. In addition, in the description below, log α represents the common logarithm of a variable α.

Value Setting of X and Y not Depending on Combination of Surface Resistivities X and Y To describe the reason for setting the ranges of the surface resistivities X and Y of the surface of the pressurizing roller 17 and the surface of the fixing film 13 by the formulae (1) to (4) described above, first, the value setting of the surface resistivities X and Y in the case of not considering the combination of the surface resistivities X and Y will be described. In this case, preferable ranges of the surface resistivities X and Y are expressed by the following formulae (5) and (6) and indicated by a hatched region in FIG. 6.

$$6.0 \le \log X \le 11.0 \quad (5)$$

$$7.0 \le \log Y \le 12.0 \quad (6)$$

The surface resistivity X of the surface of the pressurizing roller 17 is preferably 1.0E+11Ω/□ or less, that is, log X is preferably 11.0 or less. The surface resistivity Y of the surface of the fixing film 13 is preferably 1.0E+12Ω/□ or less, that is, log Y is preferably 12.0 or less. If the surface resistivities X and Y are equal to or less than the values described above, the occurrence of the electrostatic offset caused by excessive charging of the surface of the pressurizing roller 17 can be reduced by removing the charges in the surface of the pressurizing roller 17 via the fixing film 13.

The "electrostatic offset caused by excessive charging of the surface of the pressurizing roller 17" is electrostatic offset that occurs as a result of the surface of the pressurizing roller 17 bearing charges of the same polarity as the normal charging polarity of toner by being rubbed by the fixing film 13 or the recording material and the charge amount exceeding an allowable range.

A point UU in FIG. 6 indicates a case where X=1.0E+11Ω/□ and Y=1.0E+12Ω/□ hold. In this case, charges are accumulated in the surface of the pressurizing roller 17, but the surface is not excessively charged, and thus the occurrence of the electrostatic offset is reduced.

The point UU corresponds to the upper limit (upper limit of X) of the likelihood of accumulation of charges in the surface of the pressurizing roller 17 at which the charges can be removed by using the fixing film 13 to suppress excessive charging of the surface of the pressurizing roller 17 in the case of using the surface of the fixing film 13 having minimum charge removal performance (upper limit of Y). Therefore, if X is increased from the point UU or Y is increased from the point UU, that is, if the point is moved rightward or upward in FIG. 6, the accumulation of charges in the surface of the pressurizing roller 17 exceeds the charge removal performance of the fixing film 13. As a result, the excessive charging of the surface of the pressurizing roller 17 causes electrostatic offset.

The surface resistivity X of the surface of the pressurizing roller 17 is preferably 1.0E+6Ω/□ or more, that is, log X is preferably 6.0 or more. The surface resistivity Y of the surface of the fixing film 13 is preferably 1.0E+7 or more Ω/□, that is, log Y is preferably 7.0 or more. If the surface resistivities X and Y are equal to or more than the values described above, the occurrence of the electrostatic offset caused by charge leakage from the surface of the pressurizing roller 17 can be reduced.

The "electrostatic offset caused by charge leakage from the surface of the pressurizing roller 17" is a following phenomenon. In an electrophotographic process, a voltage of a polarity opposite to the normal charging polarity of the toner is applied to a transfer unit such as the transfer roller 5. In the case where a toner image is transferred onto a recording material having high electric resistance such as a recording material left in an environment of a relative humidity of less than 40%, the recording material is polarized between the front surface and the back surface thereof. That is, the surface of the recording material onto which an image has been transferred, that is, an image surface of the recording material is polarized to the same polarity as the toner, and the surface opposite to the image surface, that is, a non-image surface is polarized to a polarity opposite to that of the toner. In the case where the surface resistivity X of the surface of the pressurizing roller 17 is extremely low or the like, charges in the non-image surface of the recording material polarized between the front and back surfaces leak from the pressurizing roller 17 to the surface of the fixing film 13 when the recording material passes through the fixing nip N. As a result, the charge amount of the non-image surface of the recording material decreases, and thus the electrostatic force to bind toner to the recording material decreases, which makes the electrostatic offset more likely to occur.

A point DD in FIG. 6 indicates a case where X=1.0E+6Ω/□ and Y=1.0E+7Ω/□ hold. In this case, although a certain amount of charges leak from the surface of the pressurizing roller 17, excessive charge leakage can be avoided, and thus occurrence of the electrostatic offset can be reduced.

The point DD corresponds to the lower limit of the surface resistivity X of the surface of the pressurizing roller 17 at which the electrostatic offset caused by charge leakage in the case of using the surface of the fixing film 13 in which current relatively easily flows (lower limit of Y). Therefore, if X is reduced from the point DD or Y is reduced from the point DD, that is, if the point is moved leftward or downward in FIG. 6, the charges in the surface of the pressurizing roller 17 become more likely to excessively leak via the fixing film 13. As a result of this, electrostatic offset caused by the charge leakage from the surface of the pressurizing roller 17 can occur.

Value Setting of X and Y Performed in Consideration of Combination of Surface Resistivities X and Y Incidentally, in the present embodiment, the surface of the pressurizing roller 17 and the surface of the fixing film 13 are connected in series. Therefore, it has been found that the occurrence of the electrostatic offset may be reduced depending on the combination of the surface resistivities X and Y even in the case where the surface resistivities X and Y are out of the ranges defined by the formulae (5) and (6) described above.

For example, at a point ex (log X=12.0, log Y=6.0) in FIG. 6, the surface resistivity X of the surface of the pressurizing roller 17 is higher than the upper limit of the formula (5), and the surface resistivity Y of the surface of the fixing film 13 is lower than the lower limit of the formula (6). In this case, whereas the value of X is large and thus charges are likely to be accumulated in the surface of the pressurizing roller 17, the value of Y is small and thus the charge removal performance of the surface of the fixing film 13 is high, and therefore the series circuit including the pressurizing roller 17 and the fixing film 13 is balanced as a whole. Therefore, the occurrence of the electrostatic offset caused by excessive charging of the surface of the pressurizing roller 17 can be also reduced at the point ex.

As described above, combinations of the surface resistivities X and Y that can suppress the occurrence of the electrostatic offset even in the case where the surface resistivities X and Y are out of the ranges defined by the formulae (5) and (6) have been examined. As a result, it has been found that the occurrence of the electrostatic offset can be sufficiently reduced in a region defined by the formulae (1) to (4) described above, that is, a dot pattern region of FIG. 6.

That is, according to the present embodiment, by taking the combinations of the surface resistivities X and Y into consideration, the occurrence of the electrostatic offset can be sufficiently reduced in a wider range (dot pattern region) than in the case of evaluating X and Y individually (hatched region of FIG. 6). Therefore, the design flexibility of the fixing apparatus in terms of the material and structure of the pressurizing roller 17 and the fixing film 13 can be improved while reducing the occurrence of image defects caused by the electrostatic offset.

Specifically, according to the formula (1), a value larger than the upper limit of the formula (5) or smaller than the lower limit of the formula (5) can be employed as the surface resistivity X of the surface of the pressurizing roller 17. In addition, according to the formula (2), a value larger than the upper limit of the formula (6) or smaller than the lower limit of the formula (6) can be employed as the surface resistivity Y of the surface of the fixing film 13.

However, in the case where the value of X or Y is out of the range of the formula (1) or (2), it is difficult to avoid the occurrence of the electrostatic offset even in consideration of the combinations of X and Y. For example, in the case where the surface resistivity X exceeds 1.0E+13Ω/□, the electrostatic offset is likely to occur even if the surface resistivity Y is reduced (lower-right side of a point eUeD in FIG. 6). This is because the charge amount of the surface of the pressurizing roller 17 easily becomes excessive, and the charges cannot be sufficiently removed even if the surface resistivity Y of the surface of the fixing film 13 is reduced. Similarly, for other combinations of X and Y out of the range of the formula (1) or (2), if either X or Y is larger or smaller than the allowable range, the electrostatic offset caused by excessive charging of the surface of the pressurizing roller 17 or the electrostatic offset caused by charge leakage becomes prominent.

In addition, even within the ranges of the formulae (1) and (2), in the case where the surface resistivities X and Y are both relatively large values (upper-right side of the point UU in FIG. 6), the electrostatic offset caused by excessive charging of the surface of the pressurizing roller 17 is likely to be prominent. In addition, even within the ranges of the formulae (1) and (2), in the case where the surface resistivities X and Y are both relatively small values (lower-left side of the point DD in FIG. 6), the electrostatic offset caused by charge leakage is likely to be prominent.

Therefore, the combinations of large values of the surface resistivities X and Y and the combinations of small values of the surface resistivities X and Y are excluded by the formulae (3) and (4).

To summarize the above, as illustrated in FIG. 6, the setting conditions of the surface resistivities X and Y of the surface of the fixing film 13 and the surface of the pressurizing roller 17 in the present embodiment are defined as a hexagonal range inclined to the left.

In FIG. 6, the allowable range (dot pattern region) of X and Y in the present embodiment is wider than the range (hatched region) of X and Y allowed in the case of not taking the combinations of the surface resistivities X and Y into consideration, by a region A and a region B. The region A is a region where log X>11.0 or log Y<7.0 is satisfied in addition to the formulae (1) to (4). The region B is a region where log X<6.0 or log Y>12.0 is satisfied in addition to the formulae (1) to (4).

Value Examples of Surface Resistivities X and Y and Effects Thereof

A relationship between the surface resistivities X and Y described above, the electric charges on the surface of each member, and the electrostatic offset will be described.

Before entrance of or after discharge of the recording material Pinto or from the fixing nip N, that is, in a period in which the pressurizing roller 17 is rotating and the recording material P is not passing through the fixing nip N, the fixing film 13 and the pressurizing roller 17 are in direct contact with each other and rub each other in the entire region in the longitudinal direction of the fixing nip N. In this case, the fixing film 13 and the surface of the pressurizing roller 17 are frictionally charged. Particularly, the frictional charging is more likely to progress in an environment of a relative humidity of less than 40%. In the case where the surface of the pressurizing roller 17, that is, the surface layer 17*a* is formed from fluorine resin such as PFA, the surface of the pressurizing roller 17 is negatively charged by the frictional charging. That is, the surface of the pressurizing roller 17 is charged to the same polarity as the normal charging polarity of toner.

As described above, in the present embodiment, a substantially series circuit starting from the surface of the pressurizing roller 17 and ending at the electric ground 23 is formed. Since the surface of the pressurizing roller 17 is more on the starting point side than the surface of the fixing film 13, normally, the surface of the pressurizing roller 17 has more negative charges remaining therein and has a higher negative potential than the surface of the fixing film 13. Therefore, when the charge amount of the surface of the pressurizing roller 17 resulting from the frictional charging is excessive, a repulsive force acts on the negatively-charged unfixed toner T on the recording material P, and electrostatic offset occurs.

Here, in the region below the formula (4) in FIG. 6, the surface resistivities X and Y of the surface of the pressurizing roller 17 and the surface of the fixing film 13 do not have excessively large values as compared with the region above the formula (4), and therefore the generation of charges by the frictional charging is relatively mild. In addition, in the region below the formula (4) in FIG. 6, transfer of charges in the surface of the pressurizing roller 17 and in the surface of the fixing film 13 is relatively easy as compared with the region above the formula (4). Therefore, the charges generated in the surface of the pressurizing roller 17 by the frictional charging can be transferred to the surface of the fixing film 13 via the contact portion between the pressurizing roller 17 and the fixing film 13, and further can be smoothly transferred to the contact portion between the fixing film 13 and the contact member 21.

Therefore, in the region below the formula (4) in FIG. 6, the charges in the surface of the pressurizing roller 17 can be removed by the series circuit to an extent in which the occurrence of the electrostatic offset caused by the excessive charging of the surface of the pressurizing roller 17 can be sufficiently reduced.

To be noted, even in the region below the formula (4) in FIG. 6, it is difficult to avoid the occurrence of the electrostatic offset in the case where the value of X or Y is out of the range of the formula (1) or (2). For example, in the case where the surface resistivity X of the surface of the pressurizing roller 17 is higher than 1.0E+13Ω/□, the electrostatic offset is likely to occur even if the surface resistivity Y is set to a small value. This is because the charge amount of the surface of the pressurizing roller 17 easily becomes excessive, and the charges cannot be sufficiently removed even if the surface resistivity Y of the surface of the fixing film 13 is reduced. Similarly, in the case where the surface resistivity Y of the surface of the fixing film 13 is higher than 1.0E+14Ω/□, the electrostatic offset is likely to occur even if the surface resistivity X is set to a small value. This is because the charge removal performance of the surface of the fixing film 13 from the surface of the pressurizing roller 17 is extremely insufficient.

In the region above the formula (3) in FIG. 6, the transfer of charges in the surface of the pressurizing roller 17 and in the surface of the fixing film 13 is relatively mild as compared with the region below the formula (3). Therefore, when a recording medium that has high electric resistance and is polarized between the front and back surfaces thereof such as a recording material left in an environment of a relative humidity of less than 40% passes through the fixing nip N, leakage of the charges in the non-image surface of the recording material from the surface of the pressurizing roller 17 to the surface of the fixing film 13 can be reduced. As a result, charges leak from the non-image surface of the recording material via the surface of the pressurizing roller 17, and thus the electrostatic force to bind toner to the recording material decreases, which makes the electrostatic offset more likely to occur.

To be noted, even in the region above the formula (3) in FIG. 6, it is difficult to avoid the occurrence of the electrostatic offset in the case where the value of X or Y is out of the range of the formula (1) or (2). For example, in the case where the surface resistivity X of the surface of the pressurizing roller 17 is lower than 1.0E+4Ω/□, the charge leakage from the non-image surface of the recording material cannot be sufficiently reduced even if the surface resistivity Y is set to a large value, and thus the electrostatic offset is likely to occur. In addition, in the case where the surface resistivity Y of the surface of the fixing film 13 is lower than 1.0E+5Ω/□, the charge transfer at the contact portion between the fixing film 13 and the pressurizing roller 17 can be too active even if the surface resistivity X is set to a large value. Therefore, charge leakage from the non-image surface of the recording material cannot be sufficiently reduced, and thus the electrostatic offset can occur.

To be noted, the above description is not necessarily applicable to a case where the surface resistivity X is remarkably high and the surface resistivity Y is remarkably low (lower-right side of a point eUeD of FIG. 6) and a case where the surface resistivity X is remarkably low and the surface resistivity Y is remarkably high (upper-left side of a point eDeU of FIG. 6). However, in these cases, it is difficult to control the charge amount of the surface of the pressurizing roller 17 or the charge amount of the non-image surface of the recording material, and as a result, the electrostatic offset can occur.

As described above, in the present embodiment, a series circuit in which the surface of the pressurizing roller 17, the surface of the fixing film 13, the contact member 21, the electric passage circuit 22, and the electric ground 23 are connected in series is formed. Further, by setting the surface resistivities X and Y of the surface of the pressurizing roller 17 and the surface of the fixing film 13 within the predetermined range defined by the formulae (1) to (4), the charge amount of the surface of the pressurizing roller 17 and the non-image surface of the recording material can be controlled to such a level that occurrence of the electrostatic offset can be sufficiently reduced.

That is, according to the fixing apparatus of the present embodiment, the occurrence of electrostatic offset can be reduced by a simple configuration.

Test Results

Results of evaluation of the electrostatic offset in the case of successively performing image forming operation (successive printing) by using the printer 100 of the present embodiment will be described. As the recording material P, an A4-size paper sheet Office 70 manufactured by Canon Inc. (grammage: 70 g/m$^2$) was used. The A4-size paper sheets were used for the test after opening the sheets and leaving the sheets in an environment of 15° C. and 10% RH for 48 hours. The printing was performed in the same environmental condition. As the print conditions, successive printing of 50 pages was performed on one sides of the recording materials P at a throughput of 50 ppm. The charge amount of toner at this time was −20 μC/g, and the voltage applied to the transfer roller 5 was set to +1.5 kV.

Figure 7:
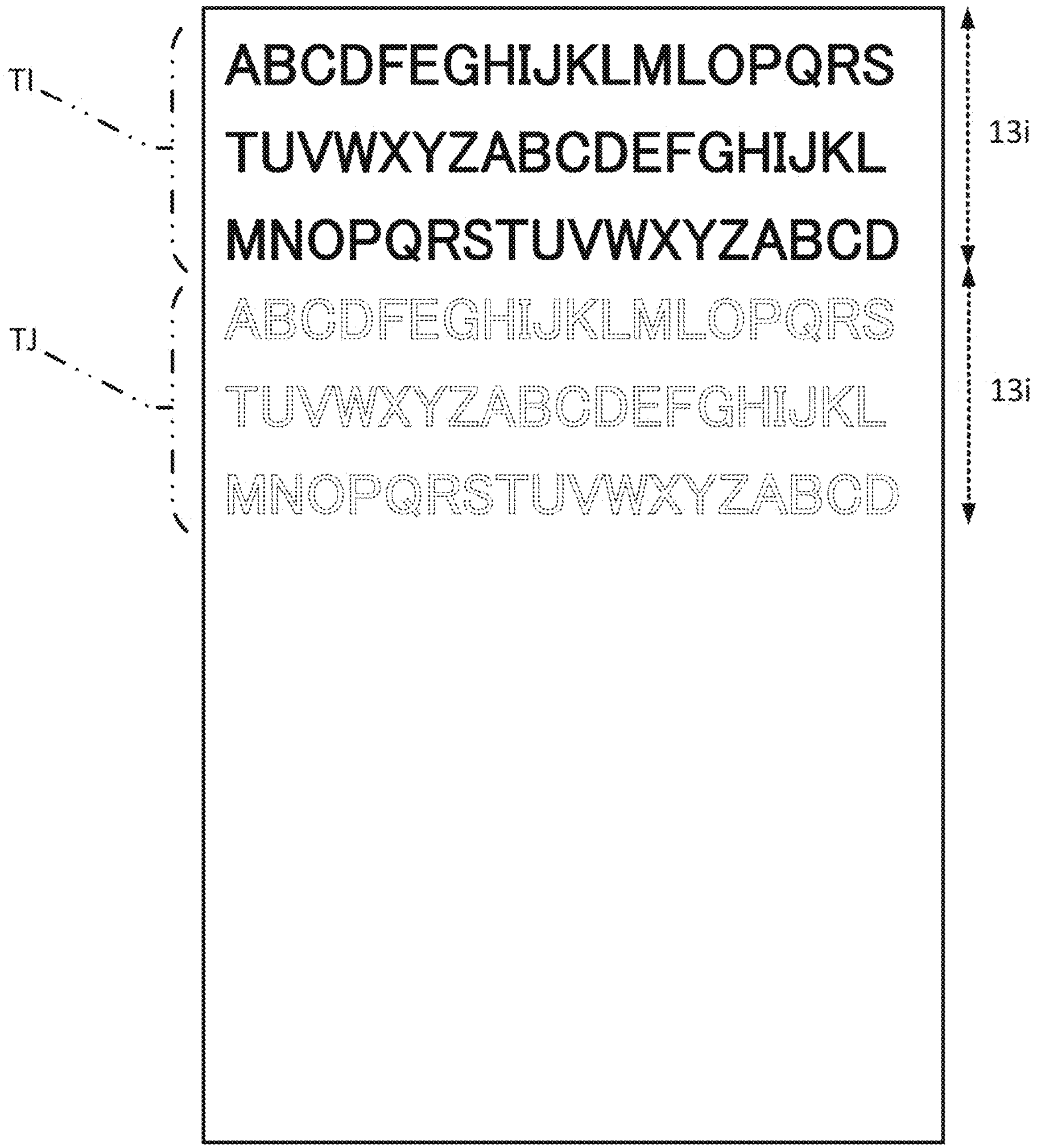
FIG. 7 is a diagram illustrating how electrostatic offset occurs.

For the evaluation of the electrostatic offset, an image as illustrated in FIG. 7 was used. That is, a character image (TI) was printed in a length (13*i*) corresponding to one rotation of the fixing film 13 on the leading end side of the recording material P in the conveyance direction. Then, the degree of toner soiling (TJ) appearing in a solid white region (non-image formation region) of a length (13*i*) corresponding to one rotation of the fixing film 13 on the trailing end side of the region where the character image (TI) was printed was evaluated. In the case where the electrostatic offset occurs, as illustrated in FIG. 7, toner soiling (TJ) occurs at a position displaced from the originally-intended character image (TI) by a length corresponding to one rotation of the fixing film 13.

In addition, the surface potential of the surface of the fixing film 13 and the surface of the pressurizing roller 17 during printing was measured. As a measurement method, a combination of a surface potential meter Model 347 and a measurement probe Model 555P-1 (both manufactured by Advanced Energy) were used.

The surface resistivities X and Y of the surface of the pressurizing roller 17 and the surface of the fixing film 13 in each evaluated example were as shown in Table 1.

Example 1-1 corresponds to a point CC (X=8.5, Y=9.5) in FIG. 6.

Example 1-2 corresponds to a point meU (X=9.0, Y=14.0) in FIG. 6.

Example 1-3 corresponds to a point eUm (X=13.0, Y=10.0) in FIG. 6.

Example 1-4 corresponds to a point eUeD (X=13.0, Y=5.0) in FIG. 6.

Example 1-5 corresponds to a point meD (X=8.0, Y=5.0) in FIG. 6.

Example 1-6 corresponds to a point eDm (X=4.0, Y=9.0) in FIG. 6.

Example 1-7 corresponds to a point eDeU (X=4.0, Y=14.0) in FIG. 6.

Example 1-8 corresponds to a point DU (X=6.0, Y=12.0) in FIG. 6.

Example 1-9 corresponds to a point UD (X=11.0, Y=7.0) in FIG. 6.

In addition, as comparative examples, evaluation tests similar to the examples described above were performed for configurations in which the combination of the surface resistivities X and Y of the surface of the pressurizing roller 17 and the surface of the fixing film 13 was out of the range defined by the formulae (1) to (4).

Comparative Example 1-1 corresponds to a point Z1 (X=12.0, Y=13.0) in FIG. 6.

Comparative Example 1-2 corresponds to a point Z2 (X=13.5, Y=4.5) in FIG. 6.

Comparative Example 1-3 corresponds to a point Z3 (X=5.0, Y=6.0) in FIG. 6.

Comparative Example 1-4 corresponds to a point Z4 (X=3.5, Y=14.5) in FIG. 6.

TABLE 1

| | SURFACE RESISTIVITY (Ω/□) | | SURFACE POTENTIAL DURING PRINTING (V) | | | |
|---|---|---|---|---|---|---|
| CONFIGURATION | PRESSURIZING ROLLER X | FIXING FILM Y | PRESSURIZING ROLLER V_2 | FIXING FILM V_1 | POTENTIAL DIFFERENCE V_2 − V_1 | ELECTROSTATIC OFFSET EVALUATION |
| EXAMPLE 1-1 | 3.2E+08 | 3.2E+09 | −300 | −200 | −100 | A |
| EXAMPLE 1-2 | 1.0E+09 | 1.0E+14 | −600 | −450 | −150 | B |
| EXAMPLE 1-3 | 1.0E+13 | 1.0E+10 | −1000 | −850 | −150 | B |
| EXAMPLE 1-4 | 1.0E+13 | 1.0E+05 | −800 | −650 | −150 | B |
| EXAMPLE 1-5 | 1.0E+08 | 1.0E+05 | −250 | −180 | −70 | B |
| EXAMPLE 1-6 | 1.0E+04 | 1.0E+09 | −200 | −120 | −80 | B |
| EXAMPLE 1-7 | 1.0E+04 | 1.0E+14 | −250 | −200 | −50 | B |
| EXAMPLE 1-8 | 1.0E+06 | 1.0E+12 | −290 | −200 | −90 | A |
| EXAMPLE 1-9 | 1.0E+11 | 1.0E+07 | −550 | −440 | −110 | A |
| COMPARATIVE EXAMPLE 1-1 | 1.0E+12 | 1.0E+13 | −2800 | −1500 | −1300 | D |
| COMPARATIVE EXAMPLE 1-2 | 3.2E+13 | 3.2E+04 | −1500 | −800 | −700 | C |

TABLE 1-continued

| CONFIGURATION | SURFACE RESISTIVITY (Ω/□) PRESSURIZING ROLLER X | FIXING FILM Y | SURFACE POTENTIAL DURING PRINTING (V) PRESSURIZING ROLLER V_2 | FIXING FILM V_1 | POTENTIAL DIFFERENCE V_2 − V_1 | ELECTROSTATIC OFFSET EVALUATION |
|---|---|---|---|---|---|---|
| COMPARATIVE EXAMPLE 1-3 | 1.0E+05 | 1.0E+06 | −10 | −5 | −5 | D |
| COMPARATIVE EXAMPLE 1-4 | 3.2E+03 | 3.2E+14 | −500 | −480 | −20 | C |

The symbols of the evaluation of the electrostatic offset image (TJ) in the table are as follows.
A: Electrostatic offset (TJ) did not occur.
B: Electrostatic offset (TJ) occurred (at a level that cannot be recognized unless observed in a magnified state).
C: Electrostatic offset (TJ) occurred (at a level that can be recognized at a glance).
D: Electrostatic offset (TJ) occurred (at a level that characters are recognizable).

As shown in Table 1, in Example 1-1, the electrostatic offset (TJ) did not occur. In Example 1-1, the surface potential of the pressurizing roller 17 was −300 V and the surface potential of the fixing film 13 was −200 V during the passage of the recording material. In terms of the potential difference, the pressurizing roller 17 was negatively polarized (−100 V) with respect to the fixing film 13, but it can be considered that since the charges in the surface of the pressurizing roller 17 did not generate a repulsive force strong enough to move the unfixed toner T, the electrostatic offset did not occur. In addition, it can be also considered that the charges in the non-image surface of the recording material did not leak so much to cause the problem of the electrostatic offset resulting from the charge leakage.

In Example 1-2, the electrostatic offset (TJ) did occur, but the level thereof was minimal and not problematic for practical use. In Example 1-2, in terms of the potential difference between the pressurizing roller 17 and the fixing film 13 during the passage of the recording material, the pressurizing roller 17 was negatively polarized with respect to the fixing film 13, and the value thereof (−150 V) was slightly larger than in Example 1-1. Therefore, it can be considered that a very small part of the unfixed toner T attached to the fixing film 13 due to the repulsive force from the charges in the surface of the pressurizing roller 17, and thus slight electrostatic offset occurred.

Also in Examples 1-3 and 1-4, the electrostatic offset (TJ) did occur, but the level thereof was minimal and not problematic for practical use. Also in Examples 1-3 and 1-4, in terms of the potential difference between the pressurizing roller 17 and the fixing film 13 during the passage of the recording material, the pressurizing roller 17 was negatively polarized with respect to the fixing film 13, and the value thereof (−150 V) was slightly larger than in Example 1-1. Therefore, it can be considered that a very small part of the unfixed toner T attached to the fixing film 13 due to the repulsive force from the charges in the surface of the pressurizing roller 17, and thus slight electrostatic offset occurred.

In Example 1-5, the electrostatic offset (TJ) did occur, but the level thereof was minimal and not problematic for practical use. In Example 1-5, in terms of the potential difference between the pressurizing roller 17 and the fixing film 13 during the passage of the recording material, the pressurizing roller 17 was negatively polarized with respect to the fixing film 13, and the value thereof (−70 V) was slightly smaller than in Example 1-1. Therefore, it can be considered that a very small part of the unfixed toner T attached to the fixing film 13 as a result of leakage of part of the charges in the non-image surface of the recording material, and thus slight electrostatic offset occurred.

Also in Examples 1-6 and 1-7, the electrostatic offset (TJ) did occur, but the level thereof was minimal and not problematic for practical use. Also in Examples 1-6 and 1-7, in terms of the potential difference between the pressurizing roller 17 and the fixing film 13 during the passage of the recording material, the pressurizing roller 17 was negatively polarized with respect to the fixing film 13, and the value thereof (−80 V, −50 V) was slightly smaller than in Example 1-1. Therefore, it can be considered that a very small part of the unfixed toner T attached to the fixing film 13 as a result of leakage of part of the charges in the non-image surface of the recording material, and thus slight electrostatic offset occurred.

In Examples 1-8 and 1-9, the electrostatic offset (TJ) did not occur. In Examples 1-8 and 1-9, in terms of the potential difference between the pressurizing roller 17 and the fixing film 13 during the passage of the recording material, the pressurizing roller 17 was negatively polarized with respect to the fixing film 13, and the value of the potential difference (−90 V, −110 V) was about the same as in Example 1-1. Therefore, it can be considered that the charges in the surface of the pressurizing roller 17 did not generate a repulsive force strong enough to move the unfixed toner T and the charges in the non-image surface of the recording material did not leak so much to cause the problem of the electrostatic offset resulting from the charge leakage.

In Comparative Example 1-1, electrostatic offset (TJ) of a level that can be recognized as characters occurred. In Comparative Example 1-1, in terms of the potential difference between the pressurizing roller 17 and the fixing film 13 during the passage of the recording material, the pressurizing roller 17 was negatively polarized with respect to the fixing film 13, and the value thereof (−1300 V) was extremely larger than in Example 1-1. Therefore, it can be considered that the unfixed toner T received a strong repulsive force from the charges in the surface of the pressurizing roller 17, and thus the electrostatic offset occurred.

In Comparative Example 1-2, electrostatic offset (TJ) of a level that can be recognized at a glance occurred. In Comparative Example 1-2, in terms of the potential difference between the pressurizing roller 17 and the fixing film 13 during the passage of the recording material, the pressurizing roller 17 was negatively polarized with respect to the fixing film 13, and the value thereof (−700 V) was not as large as in Comparative Example 1-1 but was still extremely larger than in Example 1-1. Therefore, it can be considered that the unfixed toner T received a strong repulsive force from the charges in the surface of the pressurizing roller 17, and thus the electrostatic offset occurred.

In Comparative Example 1-3, electrostatic offset (TJ) of a level that can be recognized as characters occurred. In Comparative Example 1-3, in terms of the potential difference between the pressurizing roller 17 and the fixing film 13 during the passage of the recording material, the pressurizing roller 17 was negatively polarized with respect to the fixing film 13, and the value thereof (−5 V) was extremely smaller than in Example 1-1. Therefore, it can be considered that the unfixed toner T attached to the fixing film 13 as a result of leakage of a large amount of the charges in the non-image surface of the recording material, and thus the electrostatic offset occurred.

In Comparative Example 1-4, electrostatic offset (TJ) of a level that can be recognized at a glance occurred. In Comparative Example 1-4, in terms of the potential difference between the pressurizing roller 17 and the fixing film 13 during the passage of the recording material, the pressurizing roller 17 was negatively polarized with respect to the fixing film 13, and the value thereof (−20 V) was not as small as in Comparative Example 1-3, but was still extremely smaller than in Example 1-1. Therefore, it can be considered that the unfixed toner T attached to the fixing film 13 as a result of leakage of a large amount of the charges in the non-image surface of the recording material, and thus the electrostatic offset occurred.

As described above, according to the present embodiment, the occurrence of the electrostatic offset can be reduced with a simple configuration.

In addition, as can be seen from the fact that the electrostatic offset is particularly effectively reduced in Examples 1-1, 1-8, and 1-9, the range of the hatched region (formulae (5) and (6)) of FIG. 6 is preferred for suppression of the electrostatic offset. Meanwhile, by using the region A (log X>11 or log Y<7) and the region B (log X<6 or log Y>12), the design flexibility of the fixing apparatus can be improved while reducing the electrostatic offset to a level that is not problematic for practical use.

Modification Example

In the printer 100 of the first embodiment, the contact member 21 is directly interconnected to the electric ground 23 via the electric passage circuit 22 formed from a conductor (conductive wire) as illustrated in FIG. 5. Instead of this, a circuit element or an electric circuit constituted by a plurality of elements may be provided in the electric passage circuit 22 to actively control the potential of the surface of the fixing film 13 and the surface of the pressurizing roller 17. Specifically, by providing a current limiting element to limit a current, such as an electric resistor or a variable resistor, or a rectifying element to rectify the current, such as a diode in the electric passage circuit 22, the potential of the surface of the fixing film 13 and the surface of the pressurizing roller 17 can be controlled. In addition, a plurality of the current control elements and rectifying elements may be provided in series or in parallel. Further, a voltage application circuit may be provided in the electric passage circuit 22, and a voltage may be applied to the contact member 21 to maintain the contact member 21 at a predetermined potential and thus control the potential of the surface of the fixing film 13 and the surface of the pressurizing roller 17.

Second Embodiment

A configuration of a fixing apparatus and a printer according to a second embodiment will be described. In the present embodiment, at least one layer other than the surface layer of the fixing film 13 is formed as a low-resistance layer having a lower surface resistivity than the surface layer. In the description below, it is assumed that elements denoted by the same reference signs as in the first embodiment have substantially the same configurations and effects as those described in the first embodiment, and parts different from the first embodiment will be mainly described.

As illustrated in FIG. 4, the fixing film 13 of the first embodiment includes the surface layer **13*a*, the adhesive layer 13*b*, and the base layer 13*c*. In this case, in the present embodiment, either one or each of the adhesive layer 13*b* and the base layer 13*c* is formed as a low-resistance layer from a material having a lower surface resistivity than the surface layer 13*a***.

As the low-resistance layer, a layer imparted with conductivity by adding conductive filler such as carbon black, carbon nanotube, metal, or metal oxide to a base material resin can be used. In addition, the low-resistance layer may be obtained by, for example, forming the base layer **13*c*** from a conductor such as metal.

The surface resistivity of the low-resistance layer is set to be lower than the surface resistivity of the surface layer **13*a***. In addition, the surface resistivity of the low-resistance layer is set to be equal to or less than 1.0E+5Ω/□.

To be noted, the surface resistivity of the adhesive layer **13*b*** can be measured by using Loresta-GX MCP-T700 manufactured by Nittoseiko Analytech Co., Ltd. and a PSP probe MCP-TP06P with application of 0.1 μA or 1 μA and at a measurement time of 30 seconds.

By providing a low-resistance layer at a position more inward than the surface layer **13*a* as described above, potential unevenness in the fixing film 13** can be reduced even in the case of performing successive printing for a long period, and thus occurrence of the electrostatic offset caused by the potential unevenness can be reduced.

The details will be described below. In the first embodiment, the contact member 21 is disposed so as to come into contact with the surface of the fixing film 13 outside the sheet passing region as illustrated in FIGS. 3 and 5. Here, among the end portions of the pressurizing roller 17 positioned outside the sheet passing region, an end portion region on the opposite side to the contact member 21 will be referred to as a first end region v1, and an end portion region on the same side as the contact member 21 will be referred to as a second end region v2. In this case, charges in the surface of the pressurizing roller 17 generated in the second end region v2 is transferred to the fixing film 13, and then cross the fixing film 13 in the longitudinal direction to move to the contact member 21.

Therefore, in a configuration in which the contact member 21 is brought into contact with one end portion of the fixing film 13, charges in the surface of the pressurizing roller 17 in the end portion (first end region v1 herein) on the opposite side to the contact member 21 are less likely to be removed. In the first embodiment, the potential unevenness in the fixing film 13, that is, charge removal unevenness of the pressurizing roller 17 can be reduced by setting the surface resistivity of the surface of the fixing film 13 to be low.

In contrast, in the case where successive printing is performed for a long period, the period in which the fixing film 13 and the pressurizing roller 17 are in contact with each other in the entire region of the fixing nip N becomes shorter. Therefore, the transfer of charges from the pressurizing roller 17 to the fixing film 13 is mainly performed in the first end region v1 and the second end region v2. In this case, since the surface resistivity of the surface of the fixing film 13 has the lower limit described above, there is a possibility that the charges in the surface of the pressurizing roller 17 cannot be sufficiently removed on the first end region v1 side and the electrostatic offset occurs.

To be noted, the electrostatic offset caused by the potential unevenness of the fixing film 13 described above is likely to be prominent in, for example, a case where the number of feedable recording materials is increased by connecting an additional cassette to the printer 100, or a case where an extremely large number of images are output in successive printing. In addition, also in the case where the surface resistivities of the surface of the pressurizing roller 17 and the surface of the fixing film 13 are relatively high, for example, in the range of log X≥6 and log Y≥12 or in the case where the sum of log X and log Y is close to 23, the electrostatic offset caused by the potential unevenness of the fixing film 13 is likely to be prominent.

As a method to address the potential unevenness of the fixing film 13, bringing an additional contact member 21 into contact with the fixing film 13 on the first end region v1 side and removing charges by both the end portions of the fixing film 13 in the longitudinal direction can be also considered. However, in this method, the configuration of the apparatus becomes complicated.

Therefore, in the present embodiment, at least one layer on the inner side of the fixing film 13 is formed as a low-resistance layer. In the description below, a configuration in which the adhesive layer 13*b* is formed as a low-resistance layer will be described as an example of the configuration of the present embodiment.

First, the transfer of charges will be described conceptually. In the case where the adhesive layer 13*b* is formed as a low-resistance layer, the surface charges of the fixing film 13 itself and the charges received from the pressurizing roller 17 move in the surface layer 13*a* of the fixing film 13 in the thickness direction and reach the adhesive layer 13*b*. The charges further move in the adhesive layer 13*b* in the circumferential direction and in the longitudinal direction and flow toward the contact member 21.

The surface resistivity of the adhesive layer 13*b* is lower than the lower limit (1.0E+5Ω/□) of the surface resistivity Y of the surface of the fixing film 13. Therefore, in the adhesive layer 13*b*, charges can be moved toward the contact member 21 more quickly than in the surface layer 13*a* constituting the surface of the fixing film 13. In addition, the charge unevenness in the surface of the fixing film 13 can be resolved by dissipating charges in the adhesive layer 13*b*. However, if the surface resistivity of the adhesive layer 13*b* is set to be 1.0E+5Ω/□ or more, the difference from the surface layer 13*a* becomes small, and thus the effect described above deteriorates.

The charges having moved to the position of the contact member 21 in the adhesive layer 13*b* move in the surface layer 13*a* in the thickness direction, and reach the contact member 21. The flow of the charges after this is similar to that of the first embodiment.

Figure 8:
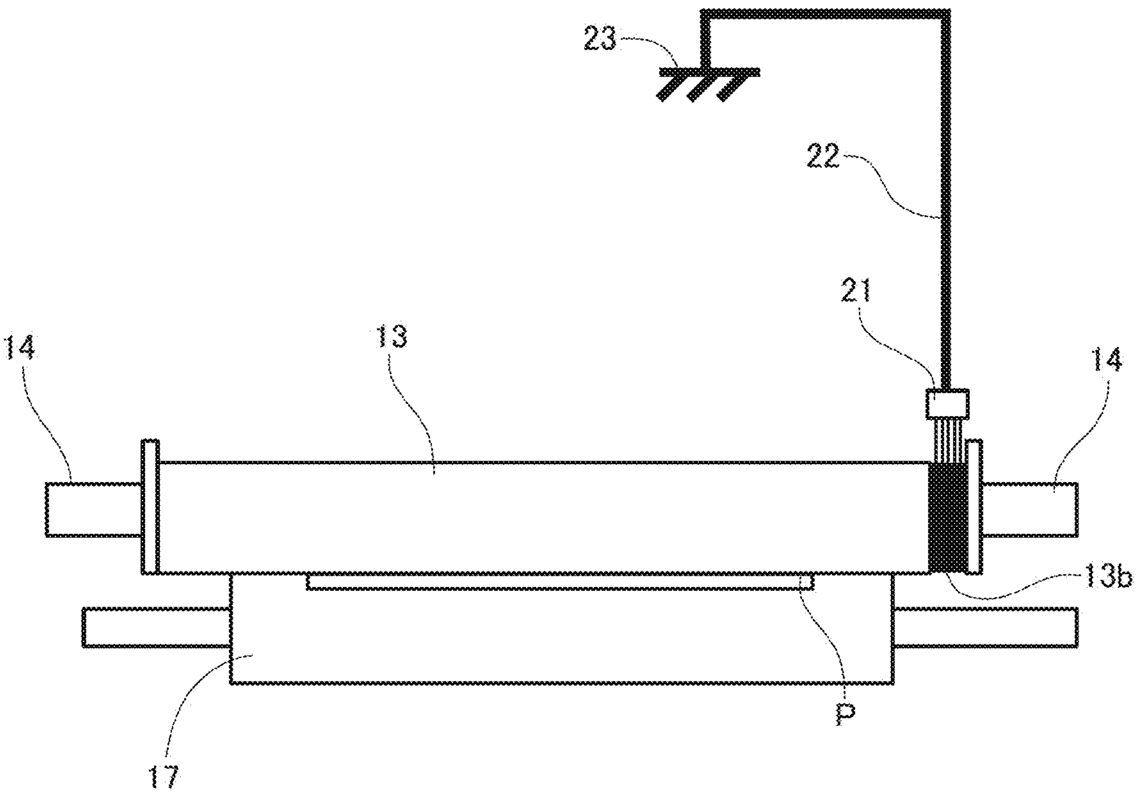
FIG. 8 is a schematic view of a fixing apparatus according to a first modification example of a second embodiment.

To be noted, as a first modification example, an exposed portion where the surface layer 13*a* of the fixing film 13 is not provided at the position of the contact member 21 as illustrated in FIG. 8 such that the adhesive layer 13*b* is exposed therein may be provided. In the exposed portion, the adhesive layer 13*b* is exposed to the surface (outer surface) of the fixing film 13. In the case of providing the exposed portion of the adhesive layer 13*b*, charges can be directly removed from the adhesive layer 13*b* by bringing the contact member 21 into contact with the exposed portion.

The exposed portion described above is provided at an end portion on one side of the fixing film 13 in the longitudinal direction. As a result of this, contact of the adhesive layer 13*b* with the pressurizing roller 17 and the recording material P can be reduced. When the adhesive layer 13*b* having low surface resistivity comes into contact with the pressurizing roller 17 or the recording material P, there is a possibility that the expected potential relationship cannot be realized and an image defect such as the electrostatic offset occurs. In addition, the exposed portion is not protected by the surface layer 13*a* and is inferior to the portion where the surface layer 13*a* is provided in terms of performance such as releasability and wear resistance, and is therefore preferably not brought into contact with objects other than the contact member 21.

In the present embodiment, the surface resistivity of the surface of the fixing film 13 is set in the same range as the first embodiment. Therefore, the charge leakage from the non-image surface of the recording material P via the surface of the pressurizing roller 17 becoming problematic can be avoided even in the case where the resistance of the adhesive layer 13*b* is set to be low.

As a second modification example, the adhesive layer 13*b* and the base layer 13*c* may be formed as low-resistance layers. In the case of this configuration, similarly to the above-described case where only the adhesive layer 13*b* is formed as a low-resistance layer, it is preferable to bring the contact member 21 into contact with the surface layer 13*a*, or bring the contact member 21 into contact with the base layer 13*c* partially exposed without being covered by the surface layer 13*a*. The function of the fixing film 13 that reduces the potential unevenness is similar to that of the present embodiment.

In addition, in the second modification example described above, as illustrated in FIG. 9, the contact member 21 may be brought into contact with the inner surface of the tubular fixing film 13. To be noted, in FIG. 9, part of the fixing film 13 is seen through and indicated by a broken line so as to illustrate the contact member 21 positioned in the inner space of the fixing film 13.

Figure 9:
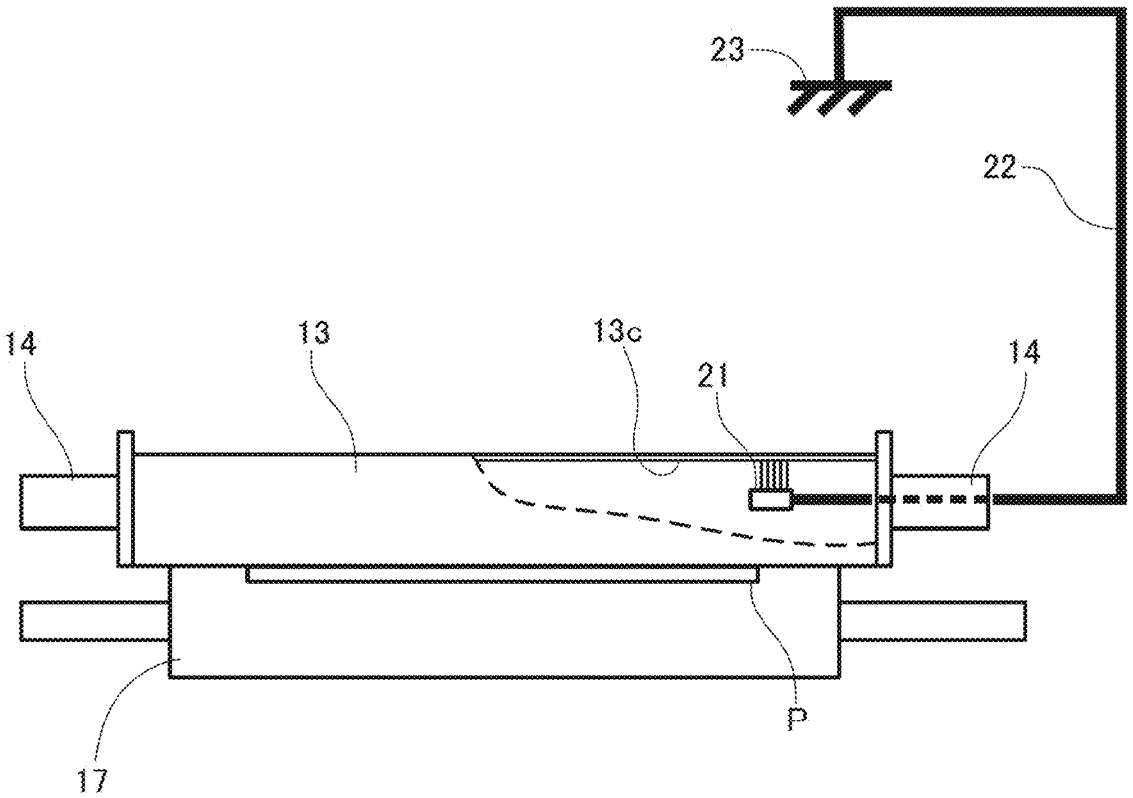
FIG. 9 is a schematic view of a fixing apparatus according to a second modification example of the second embodiment.

In the configuration in which the contact member 21 is brought into contact with the surface of the fixing film 13 or the exposed portion of the low-resistance layer as illustrated in FIGS. 5 and 8, it is preferred that soiling/damaging by paper dust from the contact member 21 or by the toner, contact of the low-resistance layer with the pressurizing roller 17 or the recording material P, and the like are avoided. Therefore, in the examples described above, the fixing film 13 is elongated in the longitudinal direction, and the contact member 21 is brought into contact with a part near an end portion of the fixing film 13 in the longitudinal direction. In the configuration of FIG. 9, a configuration like this does not need to be employed, which is advantageous in terms of the production cost of the parts and miniaturization of the apparatus. In addition, since the contact portion between the contact member 21 and the fixing film 13 is hidden on the inner side of the fixing film 13, the possibility of occurrence of mechanical breakage of the contact member 21 can be reduced even when an operation different from an originally intended operation of the fixing apparatus is performed. The operation different from the originally intended operation of the fixing apparatus is, for example, an operation in the case where a jam of the recording material has occurred and the recording material is pulled out from the fixing nip N.

Test Results

The evaluation results of the electrostatic offset in the case of successively performing image forming operation (successive printing) by using the printer 100 of the present embodiment will be described. As the printing conditions, successive printing of 1000 pages was performed on only one surfaces of the recording materials P at a throughput of 50 ppm. In addition, regarding the evaluation of the electrostatic offset (TJ), the recording material P was divided into three regions of a central region, the first end region v1, and the second end region v2 in the width direction corresponding to the longitudinal direction of the fixing film 13, and the evaluation was performed for each of the divided regions. The other parts of the evaluation method are substantially the same as in the first embodiment.

In each configuration example for which evaluation was performed, the surface resistivity X of the surface of the pressurizing roller 17 was set to 1.0E+11Ω/□, and the surface resistivity Y of the surface of the fixing film 13 was set to 1.0E+12Ω/□ (corresponding to the point UU of FIG. 6).

In Example 2-1, the surface resistivity of the adhesive layer 13*b* of the fixing film 13 was set to 1.0E+5Ω/□. In Example 2-2, the surface resistivity of the adhesive layer 13*b* of the fixing film 13 was set to 1.0E+7Ω/□. In each of these examples, the contact member 21 was brought into contact with the exposed portion of the adhesive layer 13*b* in an end portion of the fixing film 13 in the longitudinal direction.

In addition, as Comparative Example 2, one in which the surface resistivities X and Y were the same as in Examples 2-1 and 2-2, the fixing film was not provided with a low-resistance layer, and the contact member 21 was brought into contact with the surface of the fixing film 13 was evaluated in a similar manner to the examples. To be noted, the symbols of evaluation of the electrostatic offset image (TJ) in the table is substantially the same as in Table 1.

TABLE 2

| CONFIGURATION | SURFACE RESISTIVITY OF ADHESIVE LAYER (Ω/□) | ELECTROSTATIC OFFSET EVALUATION FIRST END (v1) | CENTER | SECOND END (v2) |
|---|---|---|---|---|
| EXAMPLE 2-1 | 1.0E+05 | B | B | B |
| EXAMPLE 2-2 | 1.0E+07 | C | B | B |
| COMPARATIVE EXAMPLE 2 | — | C | B | B |

First, Comparative Example 2 will be described. In Comparative Example 2, in the center portion and the second end region v2 of the recording material P, only very minimal electrostatic offset that was not practically problematic occurred even in the conditions of the present test in which successive printing of 1000 pages was performed. In contrast, in the first end region v1 that is on the far side from the contact member 21, electrostatic offset of a level recognizable at a glance occurred.

In contrast, in Example 2-1, only very minimal electrostatic offset occurred in the entire region of the recording material P in the width direction. In Example 2-2, the tendency of occurrence of electrostatic offset was similar to that of Comparative Example 2.

The reason why the occurrence of the electrostatic offset in the first end region v1 was reduced in Example 2-1 can be considered to be because the potential unevenness in the fixing film 13 during the successive printing was reduced by providing the adhesive layer 13*b* as a low-resistance layer. Meanwhile, it can be considered that, in Example 2-2 and Comparative Example 2, since the surface resistivity of the adhesive layer 13*b* was higher than in Example 2-1, the potential unevenness in the fixing film 13 during the successive printing was not reduced sufficiently.

As described above, in the present embodiment, the fixing film 13 is formed to have a multilayer structure, and at least one layer provided at a position more inward than the surface layer of the fixing film 13 is formed as a low-resistance layer. The surface resistivity of the low-resistance layer is set to be 1.0E+5Ω/□ or less. According to the above configuration, the occurrence of electrostatic offset can be reduced, for example, even in a condition in which successive printing is performed for a long period.

Other Modifications

In the embodiments described above, a configuration of a film heating system including the fixing film 13 as a fixing member, the pressurizing roller 17 as a pressurizing member, and the heater 11 as a heating portion has been described as an example. Instead of this, for example, a cylindrical roller (fixing roller) having rigidity may be used as the fixing member. In addition, in the case of using an endless film or belt as the fixing member or the pressurizing member, the film or belt may be stretched over a plurality of rollers. In addition, as the heating portion, for example, a halogen lamp that emits radiant heat may be used.

In addition, in the embodiment described above, the image forming portion 101 of a direct transfer system has been described as an example of an image forming portion. Instead of this, an image forming portion of an intermediate transfer system in which a toner image formed on an image bearing member such as the photosensitive drum 1 is transferred onto an intermediate transfer member such as an intermediate transfer belt through primary transfer, and the toner image is transferred from the intermediate transfer member onto the recording material through secondary transfer may be employed. In addition, the image forming portion may be configured to form a color image by using a plurality of image bearing members and toners of a plurality of colors.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-124522, filed on Aug. 4, 2022, which is hereby incorporated by reference herein in its entirety.

What is claimed is:

1. A fixing apparatus comprising:

a rotatable fixing member;

a rotatable pressurizing member configured to abut the fixing member at a nip portion;

a heating portion configured to heat the fixing member; and a circuit portion including a contact member and configured to remove electric charge from the fixing member, the contact member being in contact with the fixing member, wherein the fixing apparatus is configured to heat an image on a recording material by the fixing member to fix the image to the recording material while nipping and conveying the recording material between the fixing member and the pressurizing member in the nip portion, wherein a surface layer of the pressurizing member is electrically connected to the circuit portion via a surface layer of the fixing member, wherein the contact member is electrically connected with an electric ground for an electric circuit configured to supply power to the heating portion, and wherein in a case where a surface resistivity of the surface layer of the pressurizing member is represented by X (Ω/□) and a surface resistivity of the surface layer of the fixing member is represented by Y (Ω/□), $4.0 \leq \log X \leq 13.0$, $5.0 \leq \log Y \leq 14.0$, $\log Y \geq 13.0 - \log X$, and $\log Y \leq 23.0 - \log X$ are satisfied.

2. The fixing apparatus according to claim 1, wherein the fixing member is a tubular film, wherein the heating portion is a heater disposed in an inner space of the film, and wherein the pressurizing member is a roller sandwiching the film together with the heater to form the nip portion between the film and the roller.

* * * * *